US012574233B2

(12) United States Patent
Courtois et al.

(10) Patent No.: US 12,574,233 B2
(45) Date of Patent: Mar. 10, 2026

(54) KEY VAULTS WITH ACTIVE REGISTER BANKS

(71) Applicant: QUALCOMM Incorporated, San Diego, CA (US)

(72) Inventors: Nicolas Thaddee Courtois, Mougins (FR); Frederic Amiel, Nice (FR); Denis Pochuev, Orinda, CA (US); Jerome Perrine, Romanel sur Morges (CH)

(73) Assignee: QUALCOMM Incorporated, San Diego, CA (US)

( * ) Notice: Subject to any disclaimer, the term of this patent is extended or adjusted under 35 U.S.C. 154(b) by 37 days.

(21) Appl. No.: 18/824,762

(22) Filed: Sep. 4, 2024

(65) Prior Publication Data

US 2026/0067081 A1      Mar. 5, 2026

(51) Int. Cl.
*H04L 29/06* (2006.01)
*H04L 9/08* (2006.01)

(52) U.S. Cl.
CPC .......... *H04L 9/0894* (2013.01); *H04L 9/0869* (2013.01); *H04L 9/0891* (2013.01)

(58) Field of Classification Search
None
See application file for complete search history.

(56) References Cited

U.S. PATENT DOCUMENTS

2014/0304505 A1* 10/2014 Dawson .............. G06F 21/6227
                                                    713/165
2019/0327088 A1* 10/2019 Camenisch ............... H04L 9/14

FOREIGN PATENT DOCUMENTS

CN            111769935 A  * 10/2020  ........... H04L 9/0822

* cited by examiner

*Primary Examiner* — Andrew J Steinle
(74) *Attorney, Agent, or Firm* — Polsinelli LLP

(57) ABSTRACT

Systems and techniques are provided for secure computing. For instances, a process can include generating a master private key; generating a set of first dummy values; dividing the master private key into a first set of shares, wherein a sum of shares of the first set of shares equals a value of the master private key; initiating portions of an active memory bank with a sequence of integer modular additions, wherein the integer modular additions comprise: masking the first set of shares of the master private key; and adding the masked first set of shares of the master private key to portions of the active memory bank using a sequence of adds that adds and mixes the masked first set of shares of the master private key with dummy values.

20 Claims, 7 Drawing Sheets

600

Generate A Master Private Key
602

Generate A Set Of First Dummy Values
604

Divide The Master Private Key Into A First Set Of Shares
606

Initiate Portions Of The Active Memory Bank With A Sequence Of Integer Modular Additions
608

Mask The First Set Of Shares Of The Master Private Key
610

Add The Masked First Set Of Shares Of The Master Private Key To Portions Of The Active Memory Bank Using A Sequence Of Adds That Adds And Mixes The Masked First Set Of Shares Of The Master Private Key With Dummy Values
612

400

Setup Master Private Key $X_{private}$ And Chain Value C
Derivation
402

Perform Sequence Of Register Adds To Mix Random
Shares Of $X_{private}$ + $X_{private}$ Modulo Q And Dummy Values For
(k+1)*n Registers
404

Determine Public Key M Corresponding To $X_{private}$, Destroy
$X_{private}$, Save M, C, Shares Of $X_{private}$ To NVM
406

500

Receive A Key Number Or Key Path From A Signature
Requester Invoking KDF Audit Enclave
502

Recompute Stored Private Key By Adding Shares Of A Set
Of $Y_{private}$ Values Mixed With $X_{dummy}$ Values
504

Active Register Bank Continues To Auto-Shuffle Values
506

Each Of The MPC/ECDSA/Schnorr Enclaves May Read
Key From Active Register Bank And Generate Signature
508

600

KEY VAULTS WITH ACTIVE REGISTER BANKS

FIELD

Aspects of the present disclosure generally relate to device security. For example, aspects of the present disclosure relate to key vaults with active register banks for devices.

INTRODUCTION

Computing devices typically store sensitive data owned by users or enterprises, with firmware or operating system software on the computing devices owned by a computing device or secure module manufacturer. To help secure computing devices, cryptographic keys may be used to encrypt and/or decrypt data for use by the computing device. In some cases, a processor or SoC may include one or more roots of trust (RoTs), which may be used to centralize some security functionality and store important assets and information, such as the cryptographic keys. In some cases, the RoT may be embedded hardware included in the SoC, such as a hardware based trusted platform module or trusted execution environment. The RoT may be hardened against threats and attacks and traditionally may be inherently trusted. As these RoTs may include important assets and information, the RoTs may be considered high value targets for attackers. Techniques to help enhance the security of these ROT may be useful.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, methods, apparatuses, and computer-readable media for device security. According to at least one illustrative example, an electronic device is provided. The electronic device includes an active memory bank, a processor system, wherein processors, of the processor system, have dedicated channels to portions of the active memory bank, wherein a setup processor, of the processor system, has privileged access to the active memory bank. The setup processor is configured to: generate a master private key; generate a set of first dummy values; divide the master private key into a first set of shares, wherein a sum of shares of the first set of shares equals a value of the master private key; initiate portions of the active memory bank with a sequence of integer modular additions, wherein the integer modular additions comprise: mask the first set of shares of the master private key; and add the masked first set of shares of the master private key to portions of the active memory bank using a sequence of adds that adds and mixes the masked first set of shares of the master private key with dummy values.

As another example, a method for secure computing is provided. The method includes: generating a master private key; generating a set of first dummy values; dividing the master private key into a first set of shares, wherein a sum of shares of the first set of shares equals a value of the master private key; initiating portions of an active memory bank with a sequence of integer modular additions, wherein the integer modular additions comprise: masking the first set of shares of the master private key; and adding the masked first set of shares of the master private key to portions of the active memory bank using a sequence of adds that adds and mixes the masked first set of shares of the master private key with dummy values.

In another example, a non-transitory computer-readable medium having stored thereon instructions is provided. The instructions, when executed by at least one processor, cause the at least one processor to: generate a master private key; generate a set of first dummy values; divide the master private key into a first set of shares, wherein a sum of shares of the first set of shares equals a value of the master private key; initiate portions of the active memory bank with a sequence of integer modular additions, wherein the integer modular additions comprise: mask the first set of shares of the master private key; and add the masked first set of shares of the master private key to portions of the active memory bank using a sequence of adds that adds and mixes the masked first set of shares of the master private key with dummy values.

An apparatus for secure computing. The apparatus includes: means for generating a master private key; generating a set of first dummy values; means for dividing the master private key into a first set of shares, wherein a sum of shares of the first set of shares equals a value of the master private key; means for initiating portions of an active memory bank with a sequence of integer modular additions, wherein the integer modular additions comprise: means for masking the first set of shares of the master private key; and means for adding the masked first set of shares of the master private key to portions of the active memory bank using a sequence of adds that adds and mixes the masked first set of shares of the master private key with dummy values.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip implementations (e.g., processors (such as CPU, GPU, DSP, NPU), memory or storage component(s), electronic blocks which ensure I/O connectivity and multimedia capabilities, and hardware modules associated with sensors or processing data from sensors, Image Signal Processors (ISPs), embedded discrete secure hardware modules, etc. or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

Other objects and advantages associated with the aspects disclosed herein will be apparent to those skilled in the art based on the accompanying drawings and detailed description. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
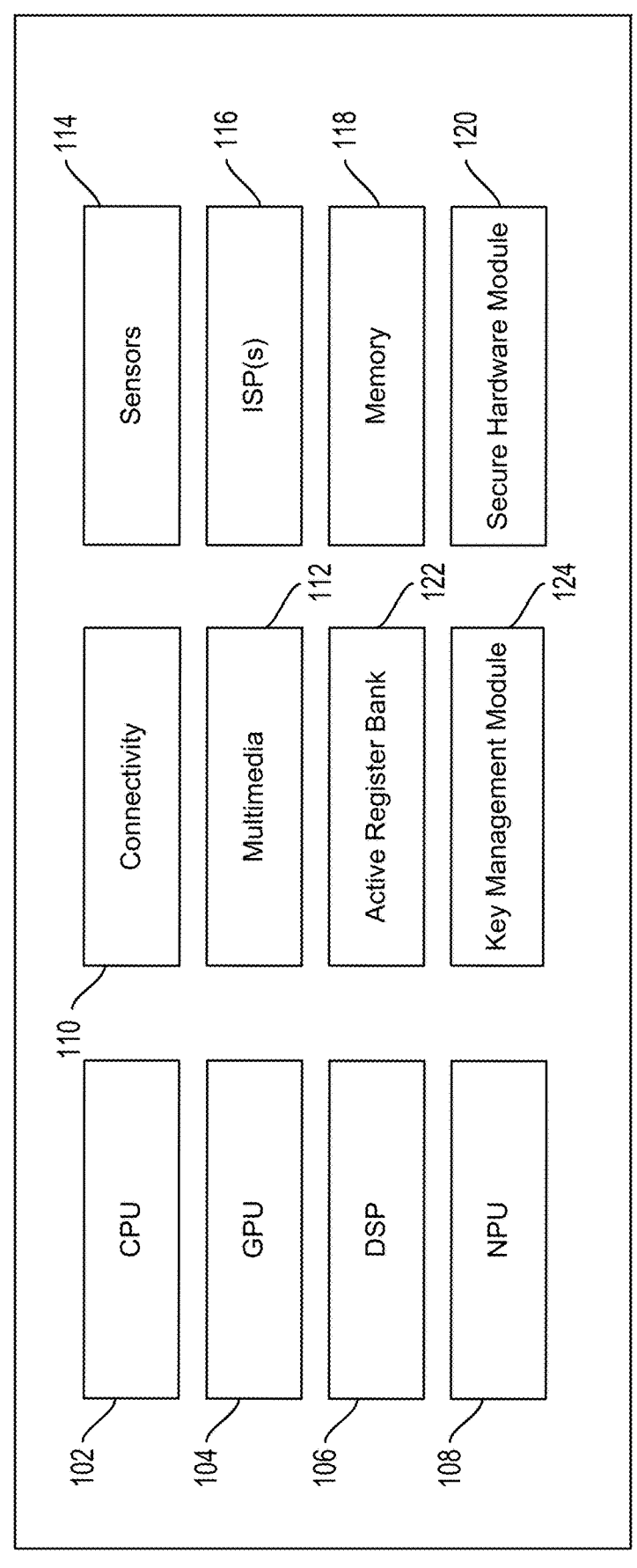
FIG. 1 illustrates an example implementation of a system-on-a-chip (SoC), in accordance with some examples.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the scope of the application as set forth in the appended claims.

Computing devices can store sensitive data. The privacy and/or security of such sensitive data is often ensured using cryptography. Cryptography generally relies on the use of long random numbers, or keys, which are traditionally stored in a secure location, such as a root of trust of a device. However, secure locations in devices may be subject to attacks, including side channel attacks, which may reveal the stored keys.

One proposed way to address potential attacks against secured locations is multi-party computation (MPC), where multiple independent parties (e.g., enclaves) may be used to perform a function (e.g., cryptographic function) without revealing the private information (e.g., input portions of a key) of the multiple independent parties. Thus, an attack at a part of the MPC may not reveal the underlying key. However, existing MPC systems rely on decentralized or fresh key generation (e.g., keys into to the MPC system), which is difficult to achieve in a production system.

Systems, apparatuses, processes (also referred to as methods), and computer-readable media (collectively referred to as "systems and techniques") are described herein for securely generating cryptographic numbers or keys and securely storing these generated cryptographic keys. For example, a key vault using an active memory, such as an active register bank, may be used to generate, store and manage keys for a set of MPC enclaves for deriving additional private keys that may be used for signatures, public key/private key encryption, etc. The active register bank may restrict the types of operations permitted to be executed using the memory of the active register bank to those operations that support execution of MPC protocols, but may restrict other operations to limit abilities of an attacker. The active register bank may include an auto-refresh capability which allows values never to be reused as they are stored as the values change over time. For example, stored values may be changed over time by adding/subtracting random numbers, such as modulus q, where q is a random number, large integer, or prime number to the stored values. Additionally, access to the active memory may be secured using permissions such that each entity that is allowed to access the active memory has either an exclusive read permission to specific active memory blocks, or an admin-level add-only permission to several registers or memory locations. In some cases, the permissions may be hardware enforced. In addition, there are specific admin instructions to reset the enclaves to a neutral state and no entity has an execute permission to the active memory. Moreover, no external entity can at all write any of these registers or memory locations, except if key management specification specifies some non-standard override functionality, or with a restore/save functions using local dedicated NVM (Non-Volatile Memory). Additionally, when certain entities have an add-only permission to the active register bank or memory locations, these entities are allowed to add arbitrary values to the values already stored in respective locations, without being able to access any values stored in the active memory (here read and write access are both denied).

In some cases, the active memory may be provisioned using a setup procedure. In a setup procedure, an entity, such as a setup enclave, may generate a master private key along with a set of dummy values. The set of dummy values may sum to zero modulo a large integer. The master private key and dummy values should be irreversibly combined at setup time and produce a distributed secret divided into a number of shares in a highly randomized rather than predictable way. This set of shares may be computed on using modular arithmetic such as modulo q. Different shares of the master private key may later be added to the active memory. The shares of the dummy values may also be added to the shares of the master private key before adding them to active memory, and also after the shares of the master private key are already stored in the active memory. A majority of shares could and should be random numbers and only their sums modulo q would reveal the sought after value. In some cases, a fault correction share may also be generated. In some cases, it should not be a single centralized fault detection share, but rather occur for several subsets of the active register bank. Each fault correction share may be generated based on a sum of the values of the other shares pertaining and accessible in read-only mode for this enclave typically, in order to allow this enclave to check for errors independently from other enclaves. This fault correction share may be used to detect potential fault attacks or values changed by malicious entities. In some cases, a key derivation function (KDF) enclave may also generate private values and the private values may also be added to the active memory. The KDF enclave may also generate dummy values and add/subtract these dummy values to their private offset values.

The KDF enclave may also have a built-in audit capability to mirror all private key operations on the public key level and possibly also to perform integrity checks on the public key level only, if the active bank register had redundancy check implemented such as $k+1$-th share. For example, the key management enclave may mirror some or all of the private key operations on the public key level by multiplying all values the key management enclave creates by the base point on the elliptic curve, in parallel and seamlessly to generate audit data. The audit data may be stored internally for the operations in an append-only log. In some cases, the audit data may be transmitted and written outside the key management enclave, such as a defined memory. This defined memory may be defined by a manufacturer and the defined memory may be a predefined buffer, address, register, etc. The audit data may be accessible in the predefined memory after each invocation of the key management enclave. These PK operations should be performed in parallel and seamlessly and results should be stored internally. Later the result of this mirror operation may be kept in local log files, or transmitted to manufacturer-mandated logging entity, or could be returned by default in a buffer or PK register, or only obtained on demand by an additional invocation of the KDF enclave with a dedicated instruction.

During an operating procedure, after receiving a request to perform a cryptographic operation, the shares of the master private key may be recomputed by summing (e.g., adding/subtracting) the shares of the master private key with shares of the private value. Mixed (e.g., mixed randomly, mixed using a pattern, interleaved, etc.) into this summing may be shares of the dummy values. Mixing the shares of the master private key with shared of the dummy values may mask the master private key. The shares of the sum of the shares of the master private key and shares of the private value may be provided to a set of MPC enclaves as a sharable key. The MPC enclaves may read the sharable key and the MPC enclaves may perform the cryptographic operation based on the shareable key.

Various aspects of the present disclosure will be described with respect to the figures.

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The term "mobile device" is used herein to refer to any one or all of cellular telephones, smartphones, Internet-of-things (IOT) devices, personal or mobile multimedia players, laptop computers, tablet computers, ultrabooks, palmtop computers, wireless electronic mail receivers, multimedia Internet enabled cellular telephones, wireless gaming controllers, smart cars, autonomous vehicles, and similar electronic devices which include a programmable processor, a memory and circuitry for sending and/or receiving wireless communication signals to/from wireless communication networks. While the various embodiments are particularly useful in mobile devices, such as smartphones and tablets, the embodiments are generally useful in any electronic device that includes secure boot circuitry for securing access to the electronic device.

Various aspects of the techniques described herein will be discussed below with respect to the figures. FIG. 1. FIG. 1 illustrates an example implementation of a system-on-a-chip (SoC) 100, which may include a central processing unit (CPU) 102 or a multi-core CPU, configured to perform one or more of the functions described herein. In some cases, the CPU 102 may be based on an ARM instruction set. Parameters or variables (e.g., neural signals and synaptic weights), system parameters associated with a computational device (e.g., neural network with weights), delays, frequency bin information, task information, among other information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, and/or may be distributed across multiple blocks. Instructions executed at the CPU 102 may be loaded from a program memory associated with the CPU 102 or may be loaded from a memory block 118.

In some cases, the SoC 100 may include additional processing blocks tailored to specific functions, such as a GPU 104, a DSP 106, an NPU 108, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU 108 is implemented in the CPU 102, DSP 106, and/or GPU 104. In some cases, the NPU 108 may be implemented as a virtual processing unit and implemented within another processing block/component. The SoC 100 may also include a sensor processor 114, image signal processors (ISPs) 116, a secure hardware module 120, active register bank 122, and/or key management module 124.

The secure hardware module 120 may include fuses, replay protected memory block (RPMB), secure bits, secure flags, security enabled hardware, secure memory, or hardware, software, or firmware used to implement a secure portion of the operating system, a secure operating system (SOS), a trusted execution environment (TEE), trusted platform module (TPM), etc. The secure hardware module 120 may be used to process and/or store sensitive data in an environment that is segregated from the rich execution environment in which the operating system and/or applications may be executed. The secure hardware module 120 can be configured to execute trusted applications that provide end-to-end security for sensitive data by enforcing confidentiality, integrity, and protection of the sensitive data stored therein. The secure hardware module 120 can be used to store encryption keys, access tokens, and other sensitive data. In some cases, the secure hardware module 120 may serve as a RoT for the SoC 100. For example, the secure hardware module 120 may provide for the secure generation of cryptographic keys, limitations on the use of such cryptographic keys, and may contain one or more cryptographic keys or elements that may be used to authenticate the SoC 100. In some cases, the RoT may serve to anchor a chain of trust to validate other hardware and/or software. In some cases, the secure hardware module 120 may be implemented as a secure area of the CPU 102, as a part of the SoC 100, or any combination thereof. The CPU 102, secure hardware module 120, or any of the other processors (e.g., GPU 104, DSP 106, and/or NPU 108) may be directly coupled to the active register bank 122. The active register bank 122 may be used to store, manage, and perform routine operations with private cryptographic keys (e.g., private keys), which may be used in cryptographic operations, such as performing asymmetric cryptography, digital signatures, etc. The key management module 124 may control/direct operations of the active register bank 122.

Figure 2:
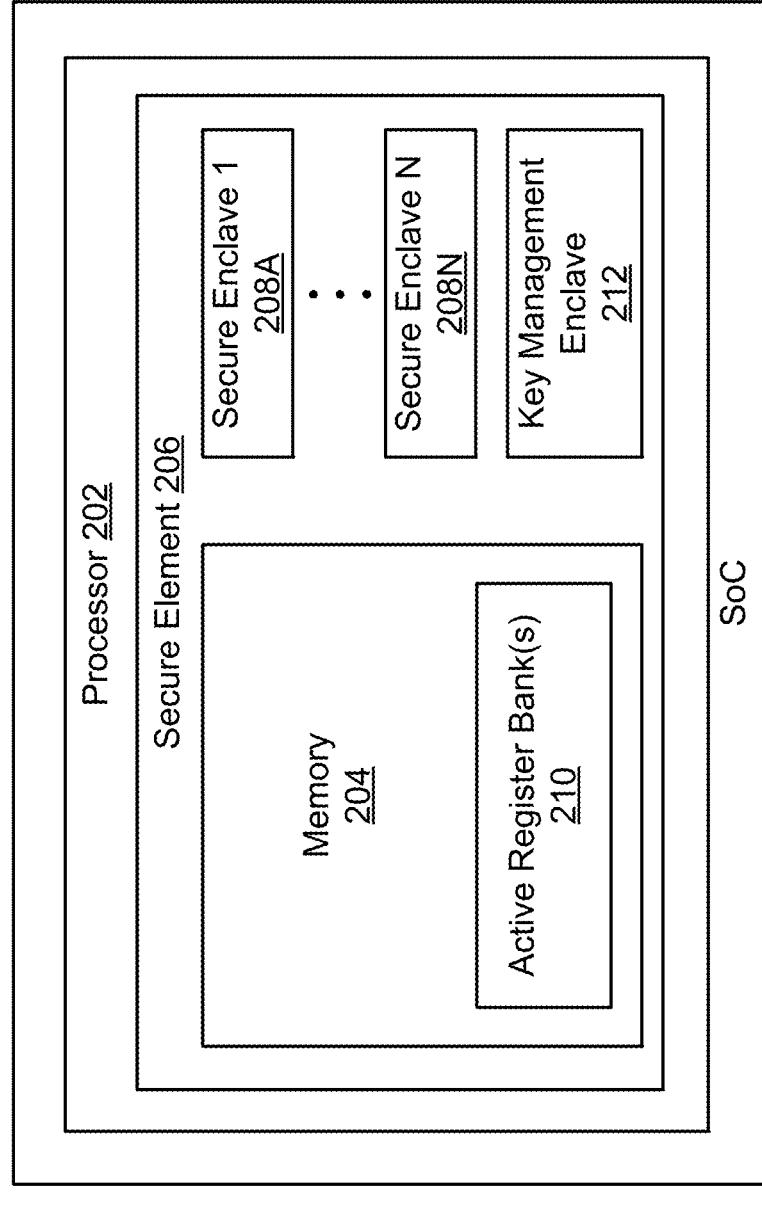
FIG. 2 is a block diagram of an SoC, in accordance with aspects of the present disclosure.

FIG. 2 is a block diagram of an SoC 200, in accordance with aspects of the present disclosure. The SoC 200 includes a processor 202 (e.g., core, chiplet, etc.) and the processor 202 includes a secure element 206 (e.g., root of trust (RoT)). The secure element 206 may include a memory 204 and one or more secure enclaves (e.g., secure enclave 1 208A, . . . secure enclave N 208N, collectively, secure enclaves 208). In some cases, the memory 204 may include one or more active register banks 210 and the secure element 206 may include a key management enclave 212 (e.g., setup enclave). In some cases, the secure element 206 may establish the secure enclaves 208 and the secure enclaves 208 may be defined based on a security boundary. The security boundary may refer to hardware and/or software that forms a trusted zone or boundary and provides the basis for performing security services. In some cases, the secure element 206, memory 204, and secure enclaves 208 may be defined by logical (e.g., virtual) boundaries rather than by separate hardware elements, components, etc. In some cases, the memory 204 may be a logical space to store one or more cryptographic keys and these cryptographic keys may be accessed by the secure enclaves 208.

In some cases, the memory 204 may include one or more banks of active registers 210, which may be sensitive cryptographic registers. For the active registers 210, each unit of memory may be represented by a named register or a memory address that may be connected in a read mode to just one of the N secure enclaves 208A-208N. In addition, each unit of memory may also implement an ability to be programmed, for example, by a key management enclave 212, which may have an ability to add an integer without an ability to read or write. In some cases, there may be a single key management enclave 212. In some cases, the key management enclave 212 may also include additional wired signals or commands to trigger admin functions, such as resetting all registers (or some portions of) the active registers 210 to zero (or to a set of default values stored in a memory), or to modify the mapping regarding which enclave 208 registers of the active registers 210 are connected to. In some cases, memory 205 may be legacy standardized multiple purpose memory such as SRAM where each block or page may have different permissions (e.g., read, write, and executable) and can be shared across several enclaves 208 connected to it. In some cases.

In some cases, the secure element 206 may include its sub-components (e.g., memory 204, active register banks 210, secure enclaves 208, key management enclave 212, etc.) in a single secure processor unit with cache and memory management units having a logical or virtual boundary, rather than through separate hardware elements. In some cases, the active register banks 210 may be a logical space implemented inside a reserved area of memory 204 to store multiple large cryptographic integers. In some cases, these special addresses for the active register banks 210 may be hardwired to be visible and/or addressable for exactly one secure enclave of the secure enclaves 208. While the SoC 200 includes a single processor 202, it should be understood that the SoC 200 may include any number of processors.

In some cases, the active register bank(s) 210 may be an active memory. Active memory may be a memory with additional built-in active internal security functionalities at the hardware level, which is also randomized, as compared to ordinary memory which operates in a passive or slave deterministic mode typically. For example, active memory includes an auto-refresh capability. With auto-refresh (or auto-shuffle), values are never reused as they are stored. Rather, stored values are independently and seamlessly (w.r.t. various entities or enclaves) modified and changed over time, in such a way that while the contents of the memory cells for a portion of memory are changing over time, but the desired joint functional effect for that subset or portion of memory with respect to a very broad range of cryptographic operations involving modular arithmetic remains exactly the same, because their sum modulo a certain fixed integer modulus remains the same. As an example, random numbers, such as mod q, may be added to one memory cell (e.g., memory block, register, etc.) of the portion of active memory and the random number may be removed (e.g., subtracted) from another memory cell of the portion of active memory. These changed values may be transparent to the entities accessing the active memory. Changing values may be performed at high speeds (e.g., up to a maximum possible speed of registers of the active memory), at regular intervals, and/or after each use of the active memory. Changing values may protect against side channel attacks against the active memory. Generally, when the active memory is being accessed (e.g., via read/write/add permissions), the active register bank is expected to behave consistently and when the active memory is not being accessed, auto refresh may be performed. The active register bank may behave consistently in that the auto refresh may occur without detrimental performance, for example, such as slower memory access. In some cases, active memory may be refreshed in an idle power state or when the active memory is not being accessed. In some cases, for auto-refresh, an even number of addresses and/or registers associated with an enclave (e.g., for a number of addresses/ registers within a range associated/assigned to a single MPC enclave) may be refreshed by adding a random number to one address and concurrently removing that random number from another address.

Active memory may also limit the activities that entities accessing the active memory may perform such that no single entity has full access to the active memory. In some cases, active memory may be tailored to support securing cryptographic data. Additionally, the active memory support unidirectional operations functions which allows an entity to perform a specific function with respect to the active memory. For example, the active memory may support an add (e.g., add-only) permission distinct and separated from any read (in some cases read-only) and write (or possibly write only) permissions. The read and write permissions may operate in a manner similar to corresponding permissions in ordinary memory. The add-only permission (e.g., +A permission) may allow an entity assigned the add permission to add a number (e.g., sum) to a portion of the active memory (e.g., a register bank, assigned memory addresses, etc.) with a memory address (e.g., named register) modulo q, where q is a large integer or prime number. The add-only permission may allow a requestor with such permission to add a number to memory: but may not allow the return of any information or acknowledgment to the requester. In some cases, each entity (e.g., enclave) may only access a subset of the active memory, after a setup procedure (e.g., setup mode) of the active memory.

The active memory may also support one-way permissions which allows entities to be assigned no more than one single type of permission at a time. For example, an entity assigned the +A (e.g., add) permission may be able to add a number to a portion of the active memory, yet should not be able to write/modify, nor should the entity be able to read, or otherwise observe the active memory. Thus, the entity with the +A memory may be able to add the number to the portion of the active memory but may not be able to determine what value is stored in the portion of the active memory. In some cases, the active memory may not allow (e.g., not support) execute permissions. In some examples, the active memory may not use private memory as static random access memory (e.g., SRAM), and the active memory may support internal monitoring and/or logging at a hardware level.

Permission limitations of active memory may be implemented on a hardware level. Active memory may be implemented based on any memory system at a hardware level. For example, active memory may be implemented based on dynamic random access memory (DRAM), as a part of a cache memory, such as L1, L2, L3, etc., caches, at a page table level for portions of a memory, using a dedicated block of SRAM, Intel Optane™ memory, magnetoresistive random access memory (MRAM), flash, E2PROM memory, registers, using custom flip-flops or hardware blocks, etc., or any combination thereof. In some cases, active memory may be implemented at a hardware level via a memory controller, memory management unit (MMU), memory protection unit (MPU), can be virtualized or subject to address translation at one or several levels, etc., or any combination thereof. In some cases, active memory may use memory zone levels associated with different entities (e.g., execution environments, enclaves, etc.) with distinct encryption keys for different entities. In some case, access to certain physical address intervals may be overridden by dedicated registers or implemented in a different way by any of the above technologies, using a segregated memory channel, or segregated memory encryption mode or/and keys.

Figure 3:
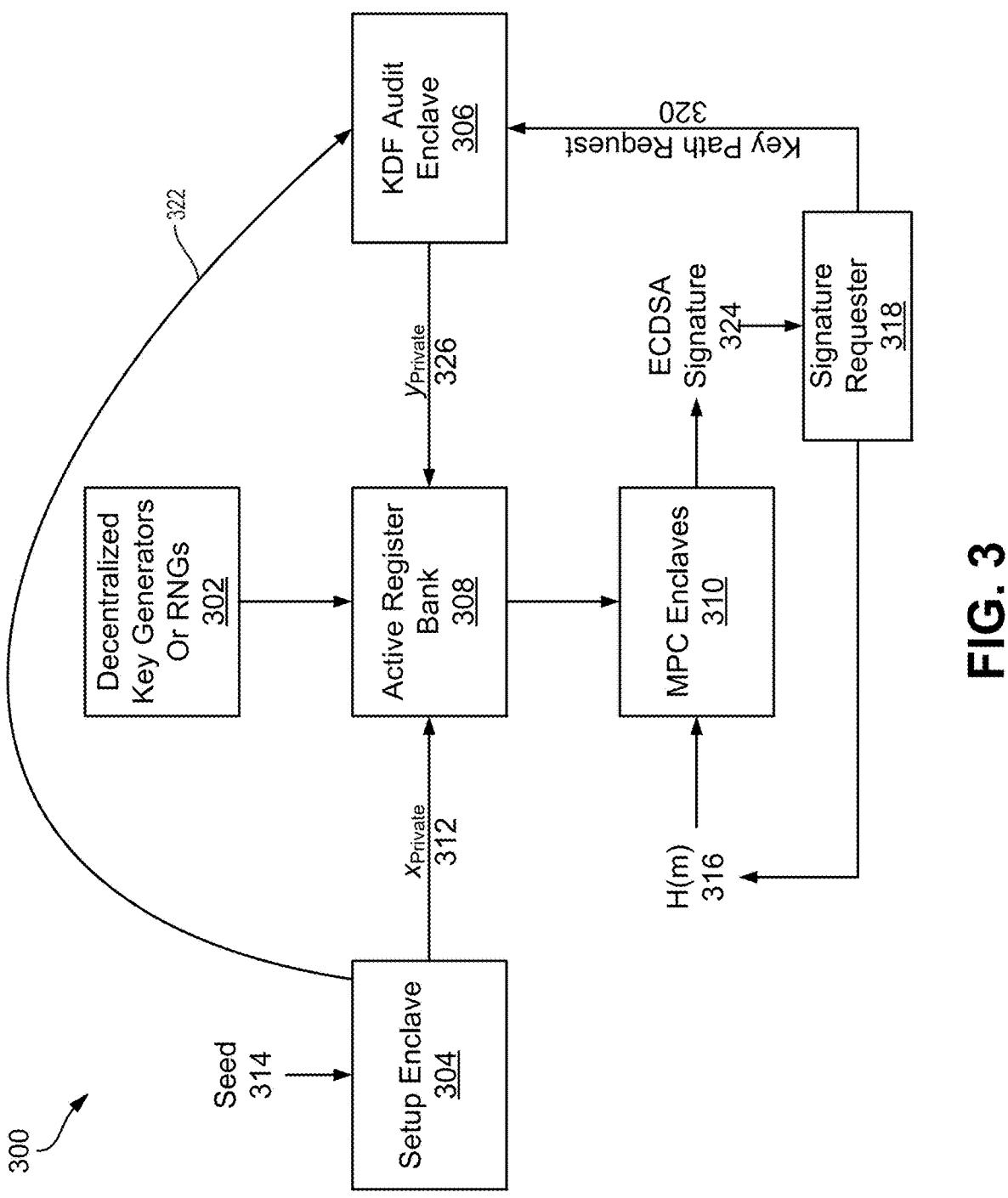
FIG. 3 is a block diagram illustrating an architecture of a key vault with an active register bank, in accordance with aspects of the present disclosure.

FIG. 3 is a block diagram illustrating an architecture of a key vault 300 with an active register bank, in accordance with aspects of the present disclosure. In some cases, the key vault 300 may be located within a secure element, such as secure element 206 of FIG. 6. The key vault may include one or more decentralized key generators 302, a single setup enclave 304 (e.g., key management enclave), a single key derivation function (KDF) enclave 306, an active register bank 308, and a set of n multi-part computation (MPC) enclaves 310. In some cases, the active register bank 308 may be an active memory implemented using a set of registers. The MPC enclaves 310 may include a set of independent enclaves which implement a cryptographic MPC protocol that allows the enclaves to jointly compute a value (e.g., signature, key, etc.) while keeping internal data (e.g., an input key) secret. As an example, the MPC enclaves 310 may implement MPC based algorithms to generate a signature or key such as Schnorr and/or elliptic curve digital signature algorithm (ECDSA) based signature. In some cases, each MPC enclave of the MPC enclaves 310 may access a portion of the active register bank 308 and these portions may not overlap with portions of the active register bank 308 accessible to another MPC enclave.

In some cases, the one or more decentralized key generators 302 may be a conventional decentralized key generator configured to generate keys. These keys may not be used as cryptographic keys, but rather as random seeds. The decentralized key generators 302 may have write access or add access (but not both) to the active register bank 308. In some cases, the decentralized key generators 302 may not include internal memory and may be used as a honeypot function and to generate random numbers that may be used for masking. In some cases, the decentralized key generators 302 may be omitted.

In some cases, the setup enclave 304 may be used relatively sparingly (e.g., yearly, once in a lifetime of a device, etc.) to generate a master private key as a part of a setup procedure for the key vault 300. In some cases, the setup enclave 304 may have a dedicated channel to the active register bank 308 as well as setup or privileged access or permissions to add information to the active register bank 308. Privileged access may be any type of higher level of access, including administrator access. In some cases, the active register bank 308 may not have read or execute permissions to the active register bank 308. The setup procedure (e.g., setup mode) may involve the setup enclave 304, the active register bank 308, portions of the KDF enclave 306, and decentralized key generators 302 (if available). The setup enclave 304 may generate a master private key $x_{private}$ 312 based on a seed 314 for storage in a nonvolatile memory (NVM). The master private key $x_{private}$ 312 may be generated using any key derivation formula, such as BIP 32, BIP 39, BIP 44, a proprietary key derivation formula, etc. The seed 314 may be obtained externally, for example, during manufacturing process of the key vault 300, from a remote server at a beginning of the setup procedure, etc. In some cases, the NVM may be a portion of the active register bank 308 or the NVM may be a memory separate from the active register bank 308 and accessible to the setup enclave 304, such as a set of eFuses. The set of eFuses may include a plurality of eFuses, which are hardware embedded one-time programmable bits (e.g., fuses) that once "blown" cannot be readily reverted to an "unblown" state. In some cases, the entirety of the active register bank 308 may be NVM and the master private key $x_{private}$ 312 may be stored in a portion of the active register bank 308. The master private key $x_{private}$ 312 may be written to the active register bank 308 in multiple shares (e.g., multiple portions). For example, a master private key $x_{private}$ 312 may be transmitted in 3*2=6 portions where the 6 portions, when summed, equal a value of the master private key $x_{private}$ 312 or a value that may be derived from the master private key $x_{private}$ 312, such as an offset value of the master private key $x_{private}$ 312. In some cases, the master private key $x_{private}$ 312 may be divided into k shares and stored in the active register bank 308.

In some cases, the shares of the master private key $x_{private}$ 312 may be added to the active register bank 308 in a way such that the other enclaves do not know where the shares are located. In some cases, adding to the active register bank 308 may be performed at a HW platform and/or memory management level and a real time RNG may be used (such as the decentralized key generators 302). For example, dummy random numbers may be added/subtracted to several registers (e.g., memory locations) of the active register bank 308 in 2 or 3 shares mod q, where q is a random number, large integer (e.g., >256 bits), and/or a prime number. In some cases, adding dummy random numbers may be used to mimic key management operations. These dummy random numbers ($x_{dummy}$) may cancel out (e.g., sum to zero), such as for $5*q-2*x_{dummy}$. and $4*q+3*x_{dummy}$. In some cases, mod q number of small multiples of the sensitive value (e.g., master private key $x_{private}$), such as $7*q+3*x_{private}$ and/or $8*q+-2*x_{private}$ may be added to server registers (e.g., memory locations) of the active register bank 308, where each multiple may be split into 2 or 3 shares to obtain the effect of adding $x_{private}$ mod q once. In some cases, several instances of both adding dummy random numbers and adding small multiples of the sensitive value may be performed, possibly in parallel, to help avoid side channel attacks. In some cases, both adding dummy random numbers and adding small multiples of the sensitive value may appear the same in terms of execution footprint and traces to avoid side channel attacks. In some cases, the addition of a small number of random multiples of q may be neutral and multiples may vary from one execution to another. In some cases, more dummy values may be added as compared to values in the shares. In some cases, at least as many random dummy values may be added as compared to a number of bits (e.g., number of registers, number of values in the shares, etc.) in the portion of the active memory. In some cases, dummy values may be used at least twice. While discussed in the context of values from the setup enclave 304 (e.g., the master private key and dummy random numbers $x_{dummy}$), it should be understood that adding shares of values in a way such that the other enclaves do not know where the shares are located in the active register bank 308 may also be performed by other enclaves, such as the KDF enclave 306. In some cases, the registers of the active register bank 308 may not have to be fully reduced to mod q. For example, probabilistic storage may be used for the active register bank 308 and multiples of q may be added at random at any moment. With probabilistic storage, at random moments, rather than following deterministic rules and patterns, multiple of q may be added to a number, stored in the probabilistic storage, absent a command or order and without informing any other entity. For users or other computing entities, the addition modulo q is neutral though a different number at different moments may be used. Thus, probabilistic storage may not contain the same value all the time, and may not return the same exact value when queried multiple times in read mode, for a cryptographic enclave allowed to read this value. Rather, probabilistic storage may modify the shared value automatically as often as possible.

In some cases, a chain value C may be generated in a manner similar to generation of the master private key $x_{private}$ 312 when the key vault supports cryptocurrencies. The chain value C may be passed 322 to, and saved in, the KDF enclave 306. The setup enclave 304 may also generate a master public key M based on the master private key $x_{private}$ 312 and the master public key M may also be passed 322 to, and saved in, the KDF enclave 306.

In some cases, the setup enclave 304 may also generate one or more dummy keys that are similar to the master private key $x_{private}$ 312, but not actually used as the master private key $x_{private}$ 312. These dummy keys may also be written to portions of the active register bank 308 and the dummy keys may not be used. The dummy keys may also be sent in portions. In some cases, the portions of the dummy keys may sum to zero.

In some cases, the setup enclave 304 may have write permissions to the active register bank 308 during a setup procedure. For example, if the active register bank 308 does not have the ability to zero out portions of the active register bank 308 prior to storing the dummy keys (as the dummy keys should sum to zero) (or does not have an ability to generate dummy keys which sum to zero), then the setup enclave 304 may have write permission to the active register bank 308 for the setup procedure. After the setup procedure, the setup enclave 304 (e.g., as the key management enclave) may have add-only permission to the active register bank 308. In some cases, such as if the active register bank 308 has the ability to initially zero out portions of the active register bank 308 storing the dummy keys (or has an ability to generate dummy keys which sum to zero). Then at later stages, the setup enclave 304 (or the KDF enclave 306) may just have add-only permissions and may add dummy keys to the active register bank 308.

In some cases, the KDF enclave 306 may generate multiple private values y'private 326 and dummy values in a manner similar to that described above with respect to the setup enclave 304. The set of private values $y_{private}$ 326 and dummy values may be added to the active register bank 308 with add-only permission only. In some cases, the private values $y_{private}$ 326 may be added to the keys stored in the active register bank 308 to recompute shares of the master private key $x_{private}$ 312. In some cases, multiple private values $y_{private}$ 326 may be added. In some cases, dummy values $y_{dummy}$ may also be added, but as the dummy values sum to 0, the dummy values do not change the master private key $x_{private}$ 312. In some cases, the KDF enclave 306 may be able to revert the whole register bank to a previous state (or a state logically equivalent to a previous state where the sum of shares is the same $x_{private}$ 312 as in some earlier stage).

In some cases, some or all of the multiple private values $y_{private}$ 326 may be added to the master private key $x_{private}$ 312 to generate a sharable key such that sharable key=$x_{private}$+2 $y_{private}$. The active register bank 308 may then provide (k+1)*n shares to the MPC enclaves 310 (e.g., k+1 shares to each enclave of the MPC enclaves 310) to use to generate a signature (e.g., ECDSA signature 324) when a signature is requested (e.g., a specific message 316 hash (H(m))). In some cases, n represents a number of MPC enclaves 310.

As indicated above, for each enclave there may be k shares of the master private key $x_{private}$ 312 stored in the active register bank 308 and one k+1-th fault control share may be provided to the MPC enclave 310. In some cases, the extra share (e.g., +1) (e.g., fault share, fault correction share)

may be used to provide fault protection. For example, the fault share, a control register, of the k+1 shares may be a sum of the other shares for this enclave only. In some cases, the control register may be determined automatically in hardware register bank. As indicated above, the active register bank 308 may change the contents of the shares. When changes are made to shares of a set of shares, the control register for the fault share is also modified (e.g., by adding a sum of the set of shares mod q to the value of the control register). In some cases, the registers used as control registers may operate at a higher speed than registers used to store the rest of the shares to avoid potential bottlenecks or timing issues. In some cases, hardware based register refreshing may be provided by a platform. For each crypto enclave, it is preferred to use indirect calculations without at places re-computing the exact sum of k shares. These formulas may be based on mathematical identities modulo q, to produce and verify these values indirectly, involving extra randomness, splitting in multiple shares or masking. The verification checks may also involve mathematical transformations which compress or transform these data, or mapping integers into some mathematical group of size being a multiple of q. The exact computation and verification formulas to use will be specified by the developers of the crypto and MPC code running on various secure enclaves.

In some cases, a signature requester 318, such as an application, may request a signature from the key vault 300. Before requesting a signature when the key vault is performing a normal operating procedure (e.g., in an operating mode, as opposed to setup mode or setup procedure), there is a preliminary step. The signature requester 318 should transmit a key path request 320 to the KDF enclave 306 in order to select and compute the private keys [distributed in many shares] which will be used. In some cases, the key path request may be made using a protected API call to limit ways in which the KDF enclave 306 may be visible to the key requester 318 or other applications. The key path request may change the private keys for all signature enclaves to behave consistently with sub keys in a BIP-32 tree-like spec. The private key update may be performed by the KDF enclave 306 acting on an active register bank before a signature command is issued. For the private key update, a sequence of adds/subtracts (e.g., additive modifications) may be performed for two or more shares of the private key by adding (e.g., summing) the shares with two or more offset values. In some cases, the offset values may be determined by a key management enclave (e.g., setup enclave 304 of FIG. 3), and the offset values may be provided in multiple shares mixed with random dummy values. In some implementations, there may be a default path or an empty path could be used, which could be operational by default and could operate correctly, if no key path change commands were issued previously. A fixed key path could be specified by the OS/admin or user limitations at installation for this application. The key requester may also transmit the message 316 (H(m)) to be signed to the MPC enclaves 310. Based on the key path request 320, the KDF enclave 306 may provide dummy values $y_{dummy}$ to the active register bank 308 and these dummy values Y'dummy may be added to the private values $y_{private}$ (with the dummy values Y'dummy summing to zero). The MPC enclaves 310 may access (e.g., via read-only permissions) specific registers (e.g., allocated to the MPC enclaves 310) of the active register bank 308 to obtain the shares.

In some cases, each enclave of the MPC enclaves 310 may be a separate, independent, cryptographic enclave and the enclaves may not be aware of the other enclaves. Each enclave of the MPC enclaves 310 may perform a cryptographic operation and the MPC enclaves 310 should treat their sum of their k shares excluding except for integrity check purposes (the optional (k+1)-th share) as one SHARE of the private key for jointly generating, for example, the ECDSA signature 324. The MPC enclaves 310 may read the shares from the active register bank 308 and generate the ECDSA signature 324 using the cryptographic operation. The ECDSA signature 324 for the message 316 may be returned to the key requester 318. In some cases, the MPC enclaves 310 may not include long term (e.g., NVM) memory.

Figure 4:
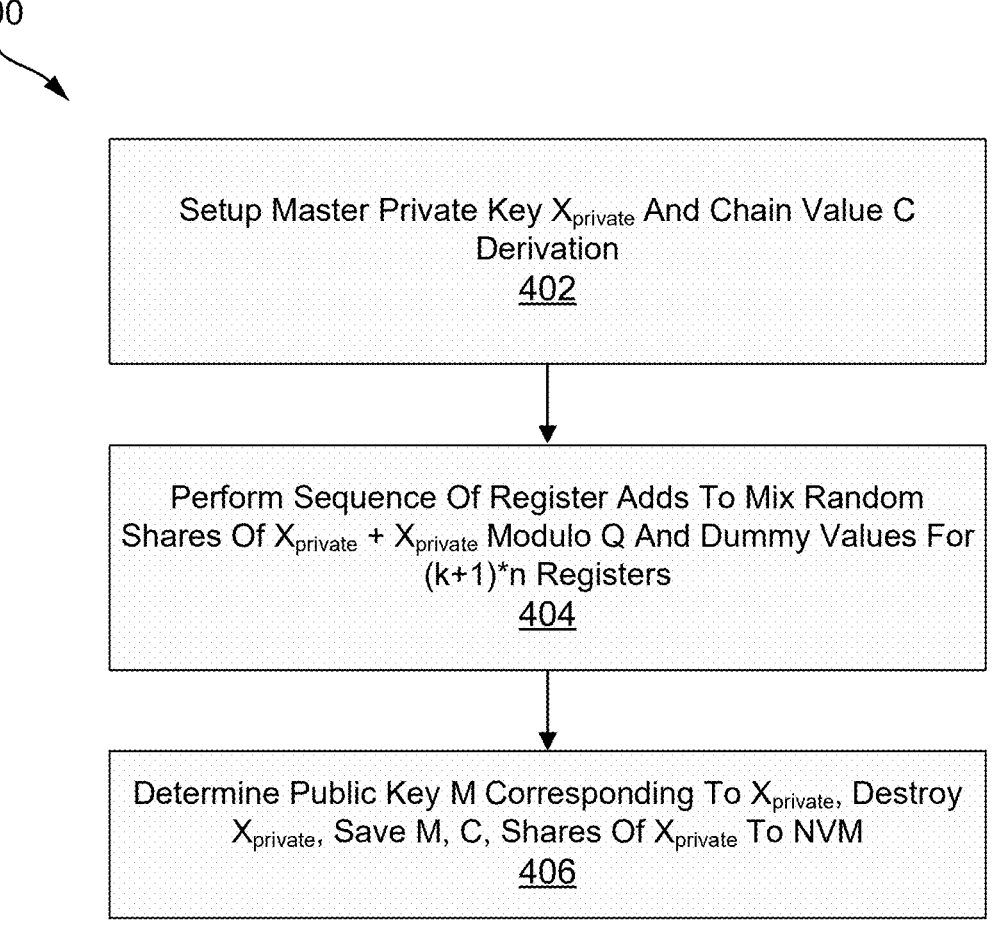
FIG. 4 is a flow diagram illustrating a setup procedure for a key vault with active register banks, in accordance with aspects of the present disclosure.

FIG. 4 is a flow diagram illustrating a setup procedure 400 for a key vault with active register banks, in accordance with aspects of the present disclosure. At step 402, the master private key (e.g., master private key $x_{private}$ 312 of FIG. 3) may be generated, for example by a setup enclave (e.g., setup enclave 304 of FIG. 3) based on a seed (e.g., seed 314 of FIG. 3). In some cases, parameters for generating the master private key $x_{private}$ may be optional values that may be used, for example, to indicate certain settings, such as whether to generate a chain value C. The chain value C may be generated when the key vault supports cryptocurrencies, but may be omitted in other cases. In some cases, the master private key $x_{private}$ and chain value C (if available) may be stored in an NVM, either by the setup enclave 304 or the active register bank 308.

At step 404, the generated master private key $x_{private}$ may be conveyed (e.g., added) to an active register bank (e.g., active register bank 308 of FIG. 3) by performing a sequence of adds (or writes as discussed above) to registers (e.g., memory address) of the active register bank. In some cases, the additions also may include, in a random order, shares of master private key $x_{private}$, $x_{private}$ modulo q (and/or shares of $x_{private}$ modulo q), and/or dummy values $x_{dummy}$. In some cases, the adds may be performed on (k+1)*n registers (e.g., memory locations) of the active register bank. The including of random adds may help obscure the master private key $x_{private}$. In some cases, the additions may be performed in shares (e.g., portions of the master private key $x_{private}$, $x_{private}$ modulo q, dummy values, etc.).

At step 406 a master public key M may be generated based on the master private key $x_{private}$. In some cases, the master public key M may be generated using any technique for generating a public key based on a private key. The master public key M may be generated by the setup enclave. The master public key M may be passed to a KDF enclave (e.g., KDF enclave 306 of FIG. 3) along with chain value C, and any additionally derived keys (if any) and saved in the KDF enclave. In some cases, the master private key $x_{private}$ may be destroyed and only shares in the active register bank may be left (e.g., stored in a distributed fashion in the active register bank).

Figure 5:
FIG. 5 is a flow diagram illustrating a routine operations procedure for a key vault with active register banks, in accordance with aspects of the present disclosure.
Figure 5:
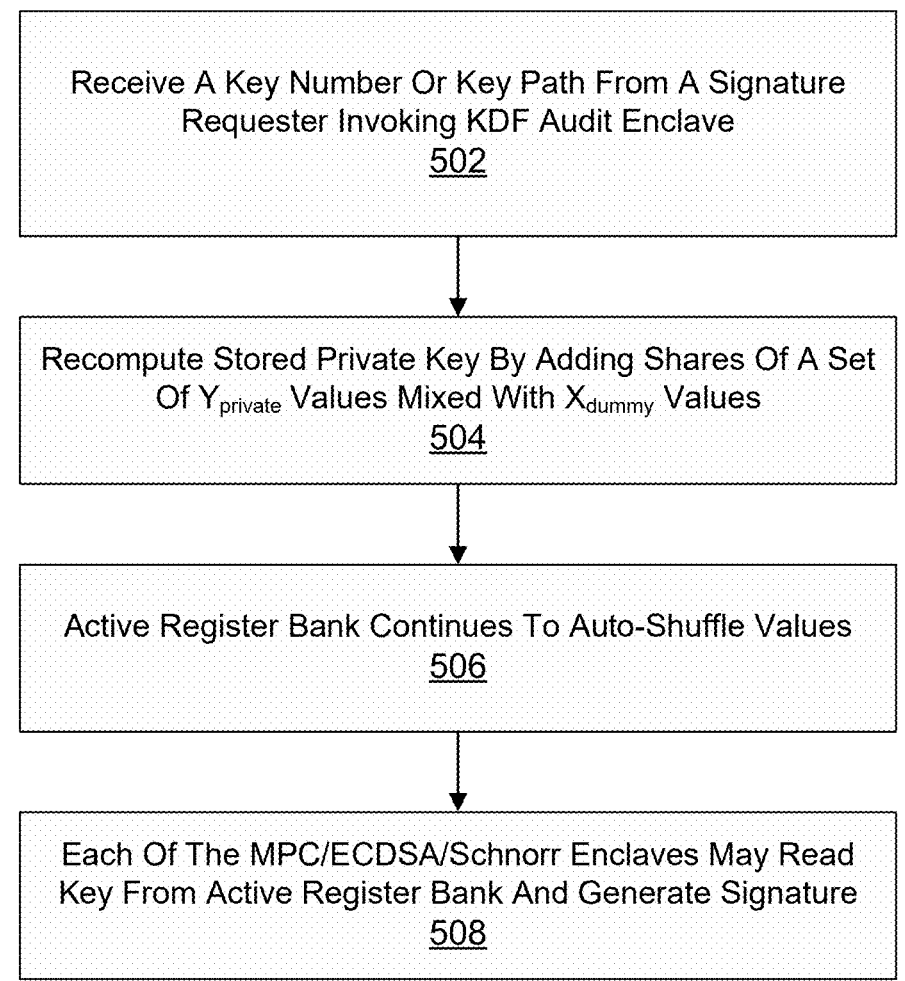

FIG. 5 is a flow diagram illustrating a routine operations procedure 500 for a key vault with active register banks, in accordance with aspects of the present disclosure. In some cases, after a setup procedure, such as setup procedure 400 is performed, the key vault will be configured to perform the routine operations procedure 500. The routine operations procedure 500 may be performed in response, to an application (e.g., signature requester) requesting a signature for a message. For example, a signature requestor may user a certain key path or key number to be used to derive the signing key when requesting a digital signature for a message, and the key path or key number that may invoke a KDF enclave, such as KDF enclave 306 of FIG. 3. Of note, while discussed in context of generating a signature, it may be understood that other cryptographic operations, such as deriving a cryptographic key must be performed before generating the signature. It is preferred that they require additional permissions under the control of OS and possibly user approval (PIN or fingerprint check). In this way Android applications could have access only to a sub-tree of possible key derivation paths which might be possible in a wallet. At block 502, a key vault (e.g., a KDF enclave or MPC enclave) may receive the signature request using a certain key number or key derivation path that invokes the KDF enclave. In some cases, a key derivation path may be a route used to obtaining (e.g., deriving) a key pair.

Based on the signature request, the KDF enclave may, at block 504, recompute master private key $x_{private}$ by adding (e.g., subtracting, summing) shares of one or more private values $y_{private}$ to the (k+1)*n registers including the shares of the master private key $x_{private}$. The KDF enclave may also mix (e.g., mixed randomly, mixed using a pattern, interleaved, etc.) in dummy values $y_{dummy}$ (adding shares of the dummy values) which sum to zero. Meanwhile, at block 506, the active register bank may continue to auto-refresh (or auto-shuffle) at any moment by, for example, adding several integers such as their sum is 0 mod q to the shares of the master private key $x_{private}$ in the k+1)*n registers. In some cases, the active register bank may auto-refresh while not being used for read/write/add access.

At block 508, the MPC enclaves may access an allocated set of registers in the active register bank and obtain a shareable key value (e.g., summed shares of $x_{private}$+ $\Sigma y_{private}$) and the MPC enclaves may generate the signature based on the obtained shareable key value. In some cases, the MPC enclaves may generate the signature via any signature generation technique such as Schnorr, ECDSA, etc. enhanced and protected by an MPC based protocol operating with shared secrets and distributed randomness.

Figure 6:
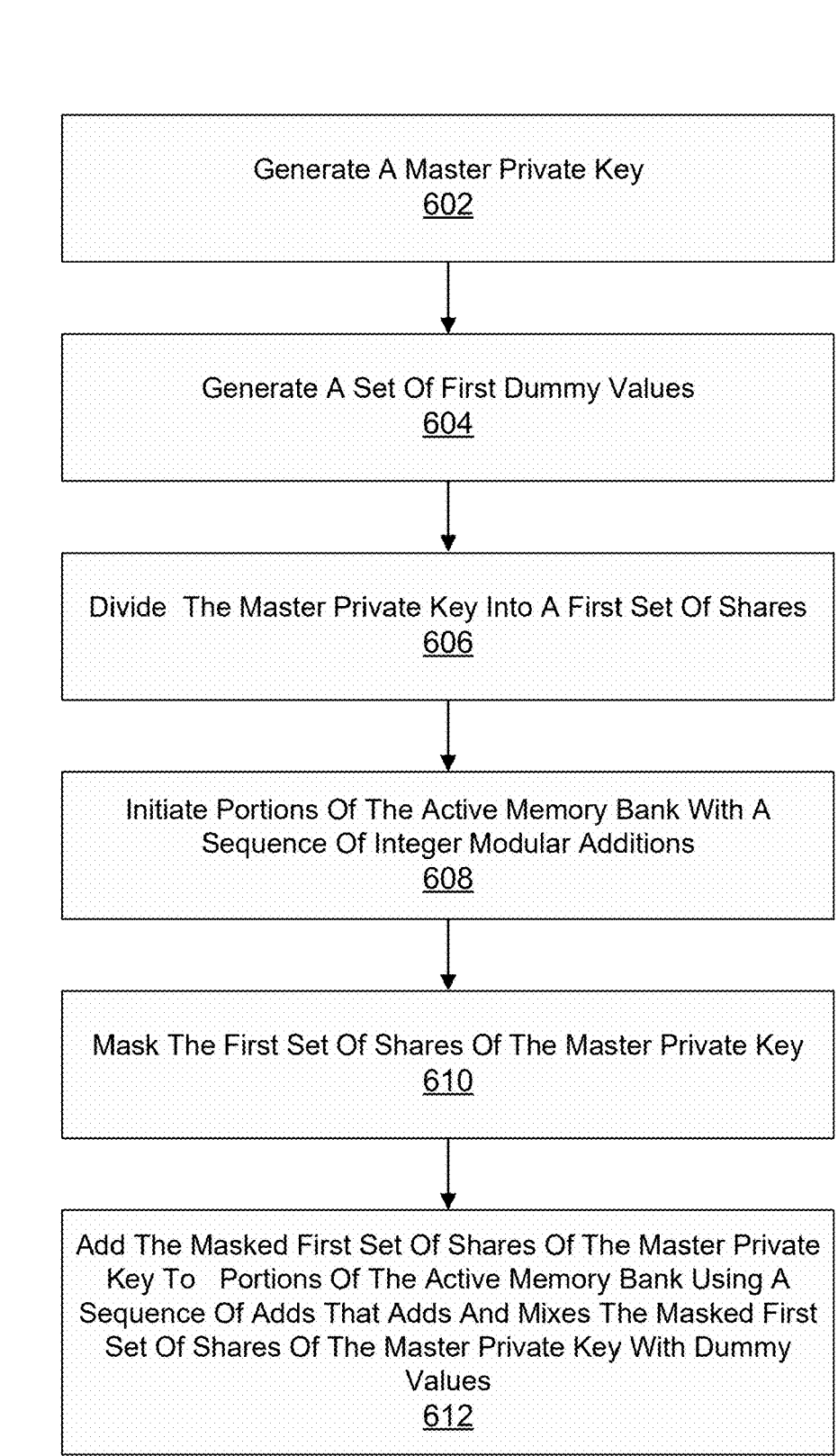
FIG. 6 is a flow diagram illustrating an example of a process for generating cryptographic keys, in accordance with aspects of the present disclosure.

FIG. 6 is a flow diagram illustrating an example of a process 600 for generating cryptographic keys, in accordance with aspects of the present disclosure. The process 600 may be performed by a wireless device or by a component (e.g., SoC 100 of FIG. 1, SoC 200 of FIG. 2, processor 202 of FIG. 2, processor 710 of FIG. 7, etc.) or system (e.g., a chipset) of the wireless device (e.g., computing system 700). The electronic device may be a wireless device, such as computing system 700, or a ME (e.g., a mobile equipment, or other device such as a mobile phone, tablet a network-connected wearable such as a watch, an extended reality device such as a virtual reality (VR) device or augmented reality (AR) device, a vehicle or component or system of a vehicle, or other type of ME) or other type of network or cloud node or chiplet or computing sub-system. In some examples, the process 600 may be performed by a ME. The operations of the process 600 may be implemented, in part, as software components that are executed and run on one or more processors (e.g., CPU 102 of FIG. 1, processor 202 of FIG. 2, processor 710 of FIG. 7, or other processor(s)).

At block 602, the computing device (or component thereof) may generate a master private key (e.g., master private key $x_{private}$ 312 of FIG. 3). In some cases, the computing device (or component thereof) may include a key management enclave which may: generate a private value; divide the private value into an initial private set of shares; and add shares of the initial private set of shares to the active memory bank. In some examples, the key management enclave is configured to create multiple combinations of multiple dummy values adding to zero, mixed with addition of private key shares added to various portions of the active memory bank. In some cases, the key management enclave is configured to reset the active memory bank as a whole to a set of stored values. In some examples, the shares of the initial private set of shares are added to the active memory bank with a set of second dummy values to mimic key management operations. In some cases, the computing device (or component thereof) may include a key management enclave, and wherein the key management enclave is configured to: mirror private key operations on a public key level by multiplying values created by a base point on an elliptic curve to obtain audit data; and store the audit data internally in an append-only log. In some examples, the key management enclave is configured to transmit the audit data to a defined memory location after each invocation of the key management enclave.

At block 604, the computing device (or component thereof) may generate a set of first dummy values. In some cases, the dummy random numbers may cancel out (e.g., sum to zero).

At block 606, the computing device (or component thereof) may divide the master private key into a first set of shares. In some cases, a sum of shares of the first set of shares equals a value of the master private key. In some examples, the computing device (or component thereof) may add random dummy values with the shares of the first set of shares, wherein random dummy values are added to the active memory bank multiple times. In some cases, each share is automatically modified by adding multiples of a modulus with random numbers by the active memory bank.

At block 608, the computing device (or component thereof) may initiate portions of the active memory bank with a sequence of integer modular additions. For example, dummy random numbers may be added/subtracted to several memory locations of the active register bank in 2 or 3 shares mod q, where q is a random number, large integer (e.g., >256 bits), and/or a prime number. In some cases, the portions of the active memory bank are configured to allow add-only access and reset access for a key management enclave. In some examples, the computing device (or component thereof) may add a first value to a location in the portions of the active memory bank, wherein adding the first value comprises summing the first value with a second value in the location of the active memory bank. In some cases, the computing device (or components thereof) may receive a request to perform a cryptographic operation for a key derivation path; and update a cryptographic private key by performing a sequence of additive modifications on two or more shares of the first set of shares by summing the two or more shares of the first set of shares with one or more offset values. In some examples, the one or more offset values are determined by the key management enclave and wherein the one or more offset values are transmitted in multiple shares mixed with third random dummy values. In some cases, the computing device (or component thereof) may read, by a set of multi-party computation enclaves, the cryptographic private key; and perform a cryptographic operation based on the cryptographic private key.

At block 610, the computing device (or component thereof) may, for integer modular addition, mask the first set of shares of the master private key. For example, mixing the shares of the master private key with shared of the dummy values may mask the master private key. In some cases, the first set of shares of the master private key are masked by multiple additions modulo a large integer with a set of dummy values.

At block 612, the computing device (or component thereof) may, for integer modular addition, add the masked first set of shares of the master private key to portions of an active memory bank (e.g., active register bank 210 of FIG. 2, active register bank 308 of FIG. 3, etc.) using a sequence of adds that adds the masked first set of shares of the master private key with dummy values. In some cases, the active memory bank is configured to auto-refresh contents of the active memory bank by adding and removing a random number from addresses of the active memory bank. In some examples, the portions of the active memory bank are configured to be limited to read-only access to one cryptographic enclave (e.g. a MPS enclave 310 associated with that portion of the active memory bank). In some cases, the computing device (or component thereof) may generate a fault correction share based on a subset of shares of the first set of shares, wherein a value of the fault correction share comprises a sum of the shares in one subset of the first set of shares. In some examples, the active memory bank comprises probabilistic storage.

In some examples, the techniques or processes described herein may be performed by a computing device, an apparatus, and/or any other computing device. In some cases, the computing device or apparatus may include a processor, microprocessor, microcomputer, or other component of a device that is configured to carry out the steps of processes described herein. In some examples, the computing device or apparatus may include a camera configured to capture video data (e.g., a video sequence) including video frames. For example, the computing device may include a camera device, which may or may not include a video codec. As another example, the computing device may include a mobile device with a camera (e.g., a camera device such as a digital camera, an IP camera or the like, a mobile phone or tablet including a camera, or other type of device with a camera). In some cases, the computing device may include a display for displaying images. In some examples, a camera or other capture device that captures the video data is separate from the computing device, in which case the computing device receives the captured video data. The computing device may further include a network interface, transceiver, and/or transmitter configured to communicate the video data. The network interface, transceiver, and/or transmitter may be configured to communicate Internet Protocol (IP) based data or other network data.

The processes described herein can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

In some cases, the devices or apparatuses configured to perform the operations of the process 600 and/or other processes described herein may include a processor, microprocessor, micro-computer, or other component of a device that is configured to carry out the steps of the process 600 and/or other process. In some examples, such devices or apparatuses may include one or more sensors configured to capture image data and/or other sensor measurements. In some examples, such computing device or apparatus may include one or more sensors and/or a camera configured to capture one or more images or videos. In some cases, such device or apparatus may include a display for displaying images. In some examples, the one or more sensors and/or camera are separate from the device or apparatus, in which case the device or apparatus receives the sensed data. Such device or apparatus may further include a network interface configured to communicate data.

The components of the device or apparatus configured to carry out one or more operations of the process 600 and/or other processes described herein can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The process 600 is illustrated as a logical flow diagram, the operations of which represent sequences of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein (e.g., the process 600 and/or other processes) may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program including a plurality of instructions executable by one or more processors. The computer-readable or machine-readable storage medium may be non-transitory.

Additionally, the processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 7:
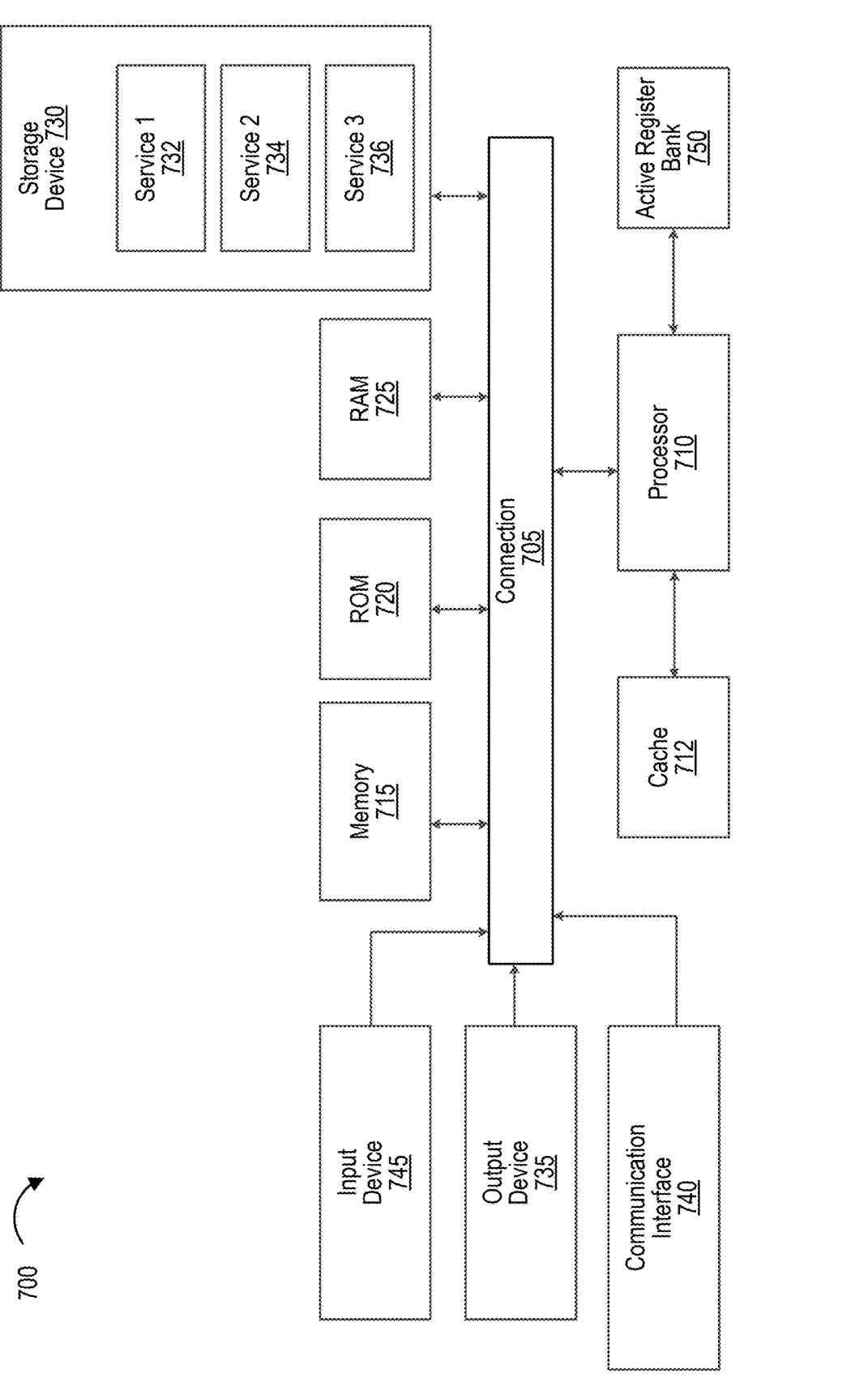
FIG. 7 is a block diagram illustrating an example of a computing system, in accordance with some examples.

FIG. 7 is a diagram illustrating an example of a system for implementing certain aspects of the present technology. In particular, FIG. 7 illustrates an example of computing system 700, which may be for example any computing device making up internal computing system, a remote computing system, a camera, or any component thereof in which the components of the system are in communication with each other using connection 705. Connection 705 may be a physical connection using a bus, or a direct connection into processor 710, such as in a chipset architecture. Connection 705 may also be a virtual connection, networked connection, or logical connection.

In some aspects, computing system 700 is a distributed system in which the functions described in this disclosure may be distributed within a datacenter, multiple data centers, a peer network, etc. In some aspects, one or more of the described system components represents many such components each performing some or all of the function for which the component is described. In some aspects, the components may be physical or virtual devices.

Example computing system 700 includes at least one processing unit (CPU or processor) 710 and connection 705 that communicatively couples various system components including system memory 725, such as read-only memory (ROM) 720 and random access memory (RAM) 725 to processor 710. Computing system 700 may include a cache 712 of high-speed memory connected directly with, in close proximity to, or integrated as part of processor 710. In some cases, computing system 700 may include an active register bank 750 of high-speed named registers with security limitations in close proximity to one or several processors 710 or connected to each processor via dedicated exclusive lines.

Processor 710 may include any general-purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which may represent any number of input mechanisms, such as a microphone for speech, a touch-sensitive screen for gesture or graphical input, keyboard, mouse, motion input, speech, etc. Computing system 700 may also include output device 735, which may be one or more of a number of output mechanisms. In some instances, multimodal systems may enable a user to provide multiple types of input/output to communicate with computing system 700.

Computing system 700 may include communications interface 740, which may generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 740 may also include one or more Global Navigation Satellite System (GNSS) receivers or transceivers that are used to determine a location of the computing system 700 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 730 may be a non-volatile and/or non-transitory and/or computer-readable memory device and may be a hard disk or other types of computer readable media which may store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 730 may include software services, servers, services, etc., that when the code that defines such software is executed by the processor 710, it causes the system to perform a function. In some aspects, a hardware service that performs a particular function may include the software component stored in a computer-readable medium in connection with the necessary hardware components, such as processor 710, connection 705, output device 735, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects may be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

Processes and methods according to the above-described examples may be implemented using computer-executable instructions that are stored or otherwise available from computer-readable media. Such instructions may include, for example, instructions and data which cause or otherwise configure a general purpose computer, special purpose computer, or a processing device to perform a certain function or group of functions. Portions of computer resources used may be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories may include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and may take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed by one or more processors, performs one or more of the methods, algorithms, and/or operations described above. The computer-readable data storage medium may form part of a computer program product, which may include packaging materials. The computer-readable medium and/or memory system may comprise any memory or data storage media, such as random access memory (RAM) such as synchronous dynamic random access memory (SDRAM), read-only memory (ROM), non-volatile random access memory (NVRAM), electrically erasable programmable read-only memory (EE-PROM), FLASH memory, magnetic or optical data storage media, memory 715, read-only memory (ROM) 720, random access memory (RAM) 725, storage device 730, and the like, and the computer-readable medium may include multiple memories or data storage media. The techniques additionally, or alternatively, may be realized at least in part by a computer-readable communication medium that carries or communicates program code in the form of instructions or data structures and that may be accessed, read, and/or executed by a computer, such as propagated signals or waves.

The program code may be executed by a processor system, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor system may be configured to perform any of the techniques described in this disclosure. A general-purpose processor may be a microprocessor; but in the alternative, the processor may be any conventional processor, controller, microcontroller, or state machine. A processor system may also be implemented as a combination of computing devices, e.g., a combination of a DSP and a microprocessor, a plurality of microprocessors, one or more microprocessors in conjunction with a DSP core, or any other such configuration. Accordingly, the term "processor system," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein may be replaced with less than or equal to ("≤") and greater than or equal to ("≥") symbols, respectively, without departing from the scope of this description.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

Illustrative Aspects of the Disclosure Include:

Aspect 1. An apparatus for secure computing, comprising: an active memory bank; a processor system, wherein processors, of the processor system, have dedicated channels to portions of the active memory bank, wherein a setup processor, of the processor system, has privileged access to the active memory bank, and wherein the setup processor is configured to: generate a master private key; generate a set of first dummy values; divide the master private key into a first set of shares, wherein a sum of shares of the first set of shares equals a value of the master private key; initiate portions of the active memory bank with a sequence of integer modular additions, wherein the integer modular additions comprise: mask the first set of shares of the master private key; and add the masked first set of shares of the master private key to portions of the active memory bank using a sequence of adds that adds and mixes the masked first set of shares of the master private key with dummy values.

Aspect 2. The apparatus of Aspect 1, wherein the active memory bank is configured to auto-refresh contents of the active memory bank by adding and removing a random number from addresses of the active memory bank.

Aspect 3. The apparatus of Aspect 2, wherein the portions of the active memory bank are configured to be limited to read-only access to one cryptographic enclave.

Aspect 4. The apparatus of any of Aspects 1-3, wherein the first set of shares of the master private key are masked by multiple additions modulo a large integer with a set of dummy values.

Aspect 5. The apparatus of any of Aspects 1-4, wherein the portions of the active memory bank are configured to allow add-only access and reset access for a key management enclave.

Aspect 6. The apparatus of any of Aspects 1-5, wherein the processor system is configured to add a first value to a location in the portions of the active memory bank, wherein adding the first value comprises summing the first value with a second value in the location of the active memory bank.

Aspect 7. The apparatus of any of Aspects 1-6, wherein the processor system is configured to generate a fault correction share based on a subset of shares of the first set of shares, wherein a value of the fault correction share comprises a sum of the shares in one subset of the first set of shares.

Aspect 8. The apparatus of any of Aspects 1-7, wherein a key management enclave of the processor system is configured to: generate a private value; divide the private value into an initial private set of shares; and add shares of the initial private set of shares to the active memory bank.

Aspect 9. The apparatus of Aspect 8, wherein the key management enclave is configured to create multiple combinations of multiple dummy values adding to zero, mixed with addition of private key shares added to various portions of the active memory bank.

Aspect 10. The apparatus of any of Aspects 8-9, wherein the key management enclave is configured to reset the active memory bank as a whole to a set of stored values.

Aspect 11. The apparatus of Aspect 10, wherein the shares of the initial private set of shares are added to the active memory bank with a set of second dummy values to mimic key management operations.

Aspect 12. The apparatus of any of Aspects 8-11, wherein the processor system is configured to: receive a request to perform a cryptographic operation for a key derivation path; and update a cryptographic private key by performing a sequence of additive modifications on two or more shares of the first set of shares by summing the two or more shares of the first set of shares with one or more offset values.

Aspect 13. The apparatus of Aspect 12, wherein the one or more offset values are determined by the key management enclave and wherein the one or more offset values are transmitted in multiple shares mixed with third random dummy values.

Aspect 14. The apparatus of any of Aspects 12-13, wherein the processor system is configured to: read, by a set of multi-party computation enclaves, the cryptographic private key; and perform a cryptographic operation based on the cryptographic private key.

Aspect 15. The apparatus of any of Aspects 1-14, wherein the processor system is configured to add random dummy values with the shares of the first set of shares, wherein random dummy values are added to the active memory bank multiple times.

Aspect 16. The apparatus of any of Aspects 1-15, wherein each share is automatically modified by adding multiples of a modulus with random numbers by the active memory bank.

Aspect 17. The apparatus of any of Aspects 1-16, wherein the active memory bank comprises probabilistic storage.

Aspect 18. The apparatus of any of Aspects 1-17, wherein the processor system includes a key management enclave, and wherein the key management enclave is configured to: mirror private key operations on a public key level by multiplying values created by a base point on an elliptic curve to obtain audit data; and store the audit data internally in an append-only log.

Aspect 19. The apparatus of Aspect 18, wherein the key management enclave is configured to transmit the audit data to a defined memory location after each invocation of the key management enclave.

Aspect 20. A method for secure computing, comprising: generating a master private key; generating a set of first dummy values; dividing the master private key into a first set of shares, wherein a sum of shares of the first set of shares equals a value of the master private key; initiating portions of an active memory bank with a sequence of integer modular additions, wherein the integer modular additions comprise: masking the first set of shares of the master private key; and adding the masked first set of shares of the master private key to portions of the active memory bank using a sequence of adds that adds and mixes the masked first set of shares of the master private key with dummy values.

Aspect 21. The method of Aspect 20, further comprising auto-refreshing contents of the active memory bank by adding and removing a random number from addresses of the active memory bank.

Aspect 22. The method of Aspect 21, wherein the portions of the active memory bank are configured to be limited to read-only access to one cryptographic enclave.

Aspect 23. The method of any of Aspects 20-22, wherein the first set of shares of the master private key are masked by multiple additions modulo a large integer with a set of dummy values.

Aspect 24. The method of any of Aspects 20-23, wherein the portions of the active memory bank are configured to allow add-only access and reset access for a key management enclave.

Aspect 25. The method of any of Aspects 20-24, further comprising adding a first value to a location in the portions of the active memory bank, wherein adding the first value comprises summing the first value with a second value in the location of the active memory bank.

Aspect 26. The method of any of Aspects 20-25, further comprising generating a fault correction share based on a subset of shares of the first set of shares, wherein a value of the fault correction share comprises a sum of the shares in one subset of the first set of shares.

Aspect 27. The method of any of Aspects 20-26, further comprising: generating, using a key management enclave, a private value; dividing, using the key management enclave, the private value into an initial private set of shares; and adding, using the key management enclave, shares of the initial private set of shares to the active memory bank.

Aspect 28. The method of Aspect 27, further comprising creating, using the key management enclave, multiple combinations of multiple dummy values adding to zero, mixed with addition of private key shares added to various portions of the active memory bank.

Aspect 29. The method of any of Aspects 27-28, further comprising resetting, using the key management enclave, the active memory bank as a whole to a set of stored values.

Aspect 30. The method of Aspect 29, wherein the shares of the initial private set of shares are added to the active memory bank with a set of second dummy values to mimic key management operations.

Aspect 31. The method of any of Aspects 27-30, further comprising: receiving a request to perform a cryptographic operation for a key derivation path; and updating a cryptographic private key by performing a sequence of additive modifications on two or more shares of the first set of shares by summing the two or more shares of the first set of shares with one or more offset values.

Aspect 32. The method of Aspect 31, wherein the one or more offset values are determined by the key management enclave and wherein the one or more offset values are transmitted in multiple shares mixed with third random dummy values.

Aspect 33. The method of any of Aspects 31-32, further comprising: reading, by a set of multi-party computation enclaves, the cryptographic private key; and performing a cryptographic operation based on the cryptographic private key.

Aspect 34. The method of any of Aspects 20-33, further comprising adding random dummy values with the shares of the first set of shares, wherein random dummy values are added to the active memory bank multiple times.

Aspect 35. The method of any of Aspects 20-34, wherein each share is automatically modified by adding multiples of a modulus with random numbers by the active memory bank.

Aspect 36. The method of any of Aspects 20-35, wherein the active memory bank comprises probabilistic storage.

Aspect 37. The method of any of Aspects 20-36, further comprising mirroring, using a key management enclave, private key operations on a public key level by multiplying values created by a base point on an elliptic curve to obtain audit data; and storing the audit data internally in an append-only log.

Aspect 38. The method of Aspect 37, further comprising transmitting, using the key management enclave, transmit the audit data to a defined memory location after each invocation of the key management enclave.

Aspect 39. A non-transitory computer-readable medium having stored thereon instructions that, when executed by at least one processor, cause the at least one processor to perform operations according to any of Aspects 20-38.

Aspect 40. An apparatus secure computing, comprising one or more means for performing operations according to any of Aspects 20-38.

What is claimed is:

1. An apparatus for secure computing, comprising:
an active memory bank;
a processor system, wherein processors, of the processor system, have dedicated channels to portions of the active memory bank, wherein a setup processor, of the processor system, has privileged access to the active memory bank, and wherein the setup processor is configured to:
generate a master private key; generate a set of first dummy values;
divide the master private key into a first set of shares, wherein a sum of shares of the first set of shares equals a value of the master private key; and
initiate portions of the active memory bank with a sequence of integer modular additions, wherein the integer modular additions comprise:
mask the first set of shares of the master private key; and
add the masked first set of shares of the master private key to portions of the active memory bank using a sequence of adds that adds and mixes the masked first set of shares of the master private key with dummy values.

2. The apparatus of claim 1, wherein the active memory bank is configured to auto-refresh contents of the active memory bank by adding and removing a random number from addresses of the active memory bank.

3. The apparatus of claim 2, wherein the portions of the active memory bank are configured to be limited to read-only access to one cryptographic enclave.

4. The apparatus of claim 1, wherein the first set of shares of the master private key are masked by multiple additions modulo a large integer with a set of dummy values.

5. The apparatus of claim 1, wherein the portions of the active memory bank are configured to allow add-only access and reset access for a key management enclave.

6. The apparatus of claim 1, wherein the processor system is configured to add a first value to a location in the portions of the active memory bank, wherein adding the first value comprises summing the first value with a second value in the location of the active memory bank.

7. The apparatus of claim 1, wherein the processor system is configured to generate a fault correction share based on a subset of shares of the first set of shares, wherein a value of the fault correction share comprises a sum of the shares in one subset of the first set of shares.

8. The apparatus of claim 1, wherein a key management enclave of the processor system is configured to:

generate a private value;

divide the private value into an initial private set of shares; and add shares of the initial private set of shares to the active memory bank.

9. The apparatus of claim 8, wherein the key management enclave is configured to create multiple combinations of multiple dummy values adding to zero, mixed with addition of private key shares added to various portions of the active memory bank.

10. The apparatus of claim 8, wherein the key management enclave is configured to reset the active memory bank as a whole to a set of stored values.

11. The apparatus of claim 10, wherein the shares of the initial private set of shares are added to the active memory bank with a set of second dummy values to mimic key management operations.

12. The apparatus of claim 8, wherein the processor system is configured to:

receive a request to perform a cryptographic operation for a key derivation path; and update a cryptographic private key by performing a sequence of additive modifications on two or more shares of the first set of shares by summing the two or more shares of the first set of shares with one or more offset values.

13. The apparatus of claim 12, wherein the one or more offset values are determined by the key management enclave and wherein the one or more offset values are transmitted in multiple shares mixed with third random dummy values.

14. The apparatus of claim 12, wherein the processor system is configured to:

read, by a set of multi-party computation enclaves, the cryptographic private key; and perform a cryptographic operation based on the cryptographic private key.

15. The apparatus of claim 1, wherein the processor system is configured to add random dummy values with the shares of the first set of shares, wherein random dummy values are added to the active memory bank multiple times.

16. The apparatus of claim 1, wherein each share is automatically modified by adding multiples of a modulus with random numbers by the active memory bank.

17. The apparatus of claim 1, wherein the active memory bank comprises probabilistic storage.

18. The apparatus of claim 1, wherein the processor system includes a key management enclave, and wherein the key management enclave is configured to:

mirror private key operations on a public key level by multiplying values created by a base point on an elliptic curve to obtain audit data; and store the audit data internally in an append-only log.

19. The apparatus of claim 18, wherein the key management enclave is configured to transmit the audit data to a defined memory location after each invocation of the key management enclave.

20. A method for secure computing, comprising:

generating a master private key;

generating a set of first dummy values;

dividing the master private key into a first set of shares, wherein a sum of shares of the first set of shares equals a value of the master private key;

initiating portions of an active memory bank with a sequence of integer modular additions, wherein the integer modular additions comprise:

masking the first set of shares of the master private key; and adding the masked first set of shares of the master private key to portions of the active memory bank using a sequence of adds that adds and mixes the masked first set of shares of the master private key with dummy values.

\* \* \* \* \*